March 16, 1954 L. M. TEMPLE 2,672,498

BATTERY

Filed Feb. 28, 1950

INVENTOR
Lemuel M. Temple
BY
ATTORNEYS

Patented Mar. 16, 1954

2,672,498

UNITED STATES PATENT OFFICE 2,672,498

BATTERY

Lemuel M. Temple, North Haven, Conn., assignor to Olin Industries, Inc., New Haven, Conn., a corporation of Delaware Application February 28, 1950, Serial No. 146,670

5 Claims. (Cl. 136—181)

This invention relates to dry batteries and more particularly to a battery having a built in resistance to prevent injury to apparatus in the circuit in which the battery is used if the battery is mistakenly inserted in the wrong circuit.

Some types of 22½ volt batteries, used as "B" batteries in certain equipment, are of substantially the same dimensions as "A" batteries used to heat the filaments of vacuum tubes of the apparatus. In many instances the instrument cases are provided with compartments having contacts between which the battery is snapped. If a "B" battery of the type referred to is mistakenly inserted into the compartment of the apparatus intended for the "A" battery, it results in damage to the tubes. However, by inserting a resistance of about 500 ohms in the battery, the current is limited to a value which will not damage the vacuum tubes if the battery is mistakenly inserted in the "A" battery circuit.

The circuit in which such battery is intended to be used may have a resistance of from 45,000 to 90,000 ohms so that the effect of the additional 500 ohms in the circuit when the battery is properly used is negligible. Thus, by employing such resistance in the battery, damage caused by wrongful insertion of the battery in an "A" circuit is avoided and, at the same time, functioning of the battery when properly used is scarcely affected.

Also in certain types of cylindrical cells, such as the magnesium cell, the initial voltage is high enough to cause injury to some types of apparatus if such cell is employed. The initial voltage of a magnesium cell of a certain size is as high as 1.8 volts and in some uses to which the battery is put, an initial voltage of more than 1.6 is disadvantageous. Such cells are provided with a central carbon electrode which projects above the top of the cell and is provided with a contact cap to which a terminal lead is connected. A resistance which may be of the order of from 0.3 to 10. ohms may be placed in the cell under the contact cap.

In either instance the resistor may be in the form of a thin film of a semi-conductive material which may be placed in the battery or cell in manufacture. The external appearance of the cell is therefore not changed but the cell or battery is insured against causing damage under the conditions set forth above.

In the accompanying drawings I have shown several forms of the invention. In this showing:

Figure 1:
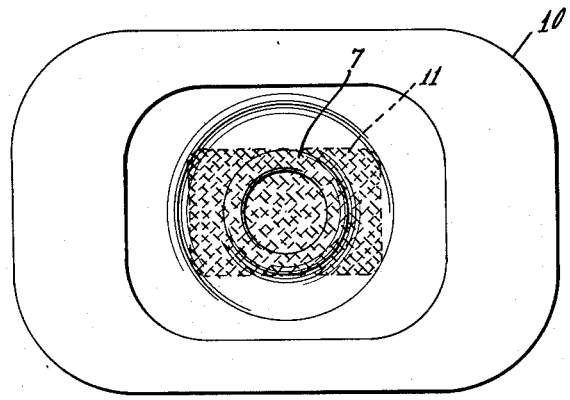
Fig. 1 is a plan view of a flat battery showing the invention applied.
Figure 2:
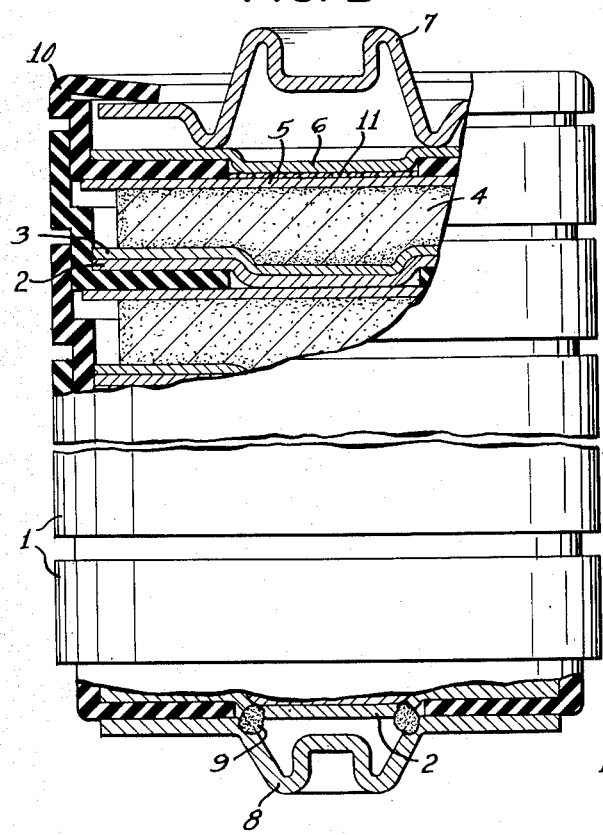
Fig. 2 is a side elevation thereof, parts being shown in section.

Referring to Figs. 1 and 2 of the drawing, the flat battery disclosed may be of any construction. The battery disclosed consists of a series of trays 1 which are stepped to permit the lower part of each tray to be nested into the upper part of the next lower tray. Each cell consists of an anode 2 which may be formed of zinc, and an absorbent sheet 3 of blotting paper or other fibrous material. The separator is provided with the usual paste coating on the side adjacent the anode and carries the usual electrolyte. A suitably shaped mix cake 4 consisting of the usual depolarizing mix is placed on the separator and a cathode 5 is in contact with the top of the mix cake. The cathode may consist of a strip of cloth or other flexible material impregnated with a carbon paint. Both the cathode and anode may be sealed to the upper and lower sides of the bottom of the tray and to each other by a conductive cement, as disclosed in the Woodring application, Serial No. 656,205, filed March 22, 1946, now Patent Number 2,526,789.

A number of these cells, sufficient to give the desired voltage, are assembled into a battery as shown in Fig. 2 of the drawing. When a number of cells are thus assembled to form a battery, a metal plate 6, which may be formed of zinc, may be placed in contact with the cathode of the top cell and connected to a terminal 7. At the bottom of the battery a similar terminal 8 may be directly connected to the zinc anode as by soldering 9. A tray 10 may be placed in the top of the cell as a closure member as shown.

In carrying out the present invention, I place the resistance directly in the battery. In a "B" battery of the type herein referred to and to prevent misuse in the manner heretofore described, the resistance element may be placed over the cathode of the upper cell, as indicated at 11, and may incorporate a resistance of substantially 500 ohms. The element 11 may be in the form of a thin film of semi-conductive material. These films are flexible, in some instances being formed of a cloth base and in other instances being formed of organic compounds to either of which finely divided carbon is added in an amount to provide the desired resistance. At times, it may be convenient to provide the resistor film as a suitable coating adhered to the outer face of the cathode of the end cell or to the cathode-contacting face of a metal terminal plate. At any rate being in sheet form, such materials lend themselves to present methods of battery production without undue complication of the manufacturing process. If such a "B" battery is inserted by mistake in an "A" circuit containing vacuum tubes rated for operation at 1.25 volts and 30 milliamperes, the tubes will not be ruined as they would be in the absence of the protective resistor in the battery. The resistance of the internal protective resistor element of this invention may be varied according to the initial voltage of the battery and its intended use. Thus, the resistance is increased for higher voltage batteries and decreased for batteries of lower voltage. In any case, the value of the resistance is the lowest which will limit the maximum current to a value which will not harm components of circuits in which the battery may be inserted.

Figure 3:
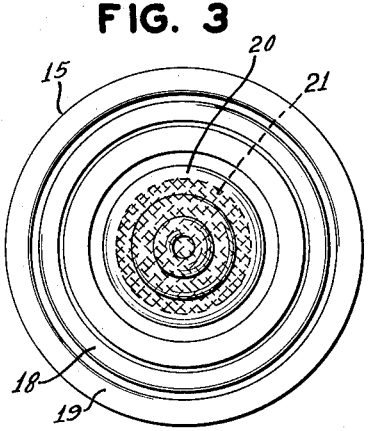
Fig. 3 is a plan view of a magnesium cylindrical cell.
Figure 4:
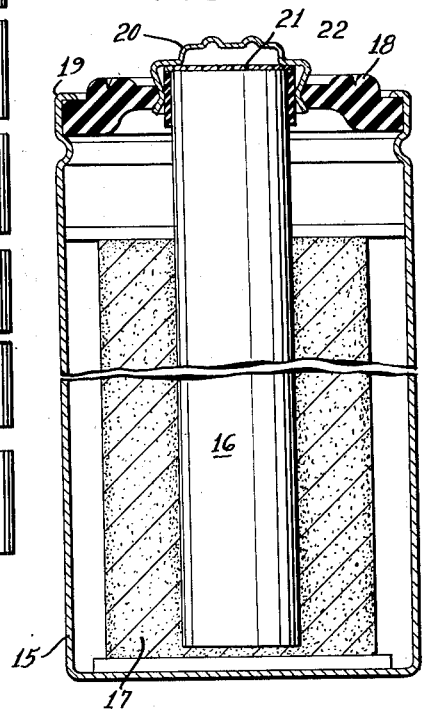
Fig. 4 is a vertical, sectional view on line 4—4 of Fig. 3.

In Figs. 3 and 4 of the drawings I have shown a cell of the cylindrical type consisting of a metal can 15 which forms the anode of the cell, a central carbon electrode 16 and a depolarizing mix 17. The cell is provided with the usual electrolyte and is also provided with a suitable closure 18 which is secured to the upper edge of the can in any suitable manner, as by crimping, indicated at 19. In such cell construction it is usual to provide a contact cap 20 which fits over the upper end of the carbon electrode 16 and projects beyond the top of the cell. Thus when such cells are employed in tandem as in a flashlight casing, the contact cap of one cell directly engages the bottom of the can of the next adjacent cell to connect the cells in series. These parts are of conventional construction and form no part of the present invention, except in the combination claimed.

In such cells a desired resistance to reduce the initial voltage of the cell can be readily incorporated during manufacturing operations in the form of a disc 21 which is cut to the same size as the diameter of the carbon pencil and is placed over the carbon pencil between it and the contact cap as shown. An insulating sleeve 22 is arranged between the carbon pencil and the skirt of the contact cap. The resistance of member 21 is preferably adjusted in accordance with the intended use generally in the range of 0.3 to 10 ohms. A value of 0.3 ohm is suitable in batteries intended for use in flashlights, reducing the initial voltage from 1.8 to 1.65 volts when used with a 0.55 ampere bulb. In "A" batteries for use with 4- or 5-tube portable radios, member 21 may have a resistance of 0.7 ohm when 3 or 4 of the tubes have a rating of 50 milliamperes. With 25 milliampere tubes, member 21 should have a resistance of 1.4 ohms. In "A" batteries for use in hearing aids, typical values of the resistance of member 21 are 4.5 ohms with a 30 milliampere circuit and 9 ohms with a 15 milliampere circuit. For other uses and other conditions which may arise or which will be apparent to the man skilled in the art, the resistance may, of course, be varied. It will be understood that when a given size of battery is adapted for a variety of uses, the resistance value may be set at the largest value required in any of the uses.

I claim:

1. A flat battery comprising groups of substantially flat cell elements arranged in proper order to form a plurality of cells with the anode of each cell in electrical contact with the cathode of the adjacent cell, a terminal connected to one of the end electrodes, a sheet of material of predetermined resistance electrically connected to the other end electrode, and a terminal electrically connected to the sheet of material and retaining it in position in contact with the adjacent electrode.

2. A flat battery comprising groups of substantially flat cell elements arranged in proper order to form a plurality of cells with the anode of each cell in electrical contact with the cathode of the adjacent cell, a terminal connected to the anode of one end cell, a sheet of material of predetermined resistance in electrical contact with the cathode of the other end cell, and a terminal electrically connected to the sheet of material and retaining it in position in contact with the adjacent electrode.

3. A dry cell comprising a metal can forming an anode, a depolarizing mix within the can, a central electrode forming the cathode of the cell, a resistance element mounted on the upper end of the central electrode, and a contact cap mounted over the resistance element.

4. A battery comprising electrodes of opposite polarity, a terminal for one electrode, and a sheet of material of predetermined resistance arranged between said terminal and said electrode, said terminal comprising a metal cap retaining the said sheet in position in contact with the adjacent electrode, and said terminal and electrode being electrically insulated from one another except through said sheet.

5. A battery comprising electrodes of opposite polarity, a sheet of material of predetermined resistance arranged in contact with one of the electrodes, and a pair of terminals, one of said terminals comprising a metal cap retaining said sheet in position in contact with the adjacent electrode, and said terminal and said electrode being electrically insulated from each other except through said sheet.

LEMUEL M. TEMPLE.

References Cited in the file of this patent

UNITED STATES PATENTS

| Number | Name | Date |
|---|---|---|
| 1,099,381 | Krafft | June 9, 1914 |
| 1,264,520 | Holmes | Apr. 30, 1918 |
| 2,453,865 | Schmidt | Nov. 16, 1948 |

FOREIGN PATENTS

| Number | Country | Date |
|---|---|---|
| 251,328 | Great Britain | Apr. 27, 1926 |
| 452,974 | Great Britain | Sept. 3, 1936 |